United States Patent
Ho et al.

(10) Patent No.: US 7,292,637 B2
(45) Date of Patent: Nov. 6, 2007

(54) NOISE-TOLERANT SIGNALING SCHEMES SUPPORTING SIMPLIFIED TIMING AND DATA RECOVERY

(75) Inventors: Andrew Ho, Palo Alto, CA (US); Vladimir Stojanovic, Stanford, CA (US); Fred F. Chen, San Francisco, CA (US); Elad Alon, Saratoga, CA (US); Mark A. Horowitz, Menlo Park, CA (US)

(73) Assignee: Rambus Inc., Los Altos, CA (US)

( * ) Notice: Subject to any disclaimer, the term of this patent is extended or adjusted under 35 U.S.C. 154(b) by 686 days.

(21) Appl. No.: 10/739,823

(22) Filed: Dec. 17, 2003

(65) Prior Publication Data

US 2005/0135489 A1 Jun. 23, 2005

(51) Int. Cl.
- *H04B 3/00* (2006.01)
- *H04B 1/10* (2006.01)
- *H04B 1/18* (2006.01)
- *H03D 1/04* (2006.01)

(52) U.S. Cl. .............. 375/257; 375/346; 455/283; 455/280

(58) Field of Classification Search .......... 375/257, 375/258–259, 295; 327/89, 359, 563; 330/253, 330/258; 455/283
See application file for complete search history.

(56) References Cited

U.S. PATENT DOCUMENTS

| | | | |
|---|---|---|---|
| 5,412,692 A | 5/1995 | Uchida | 375/317 |
| 5,509,126 A | 4/1996 | Oprescu et al. | |
| 5,559,967 A | 9/1996 | Foley et al. | |
| 6,295,323 B1 | 9/2001 | Gabara | |
| 6,545,507 B1 | 4/2003 | Goller | 326/93 |
| 6,573,760 B1* | 6/2003 | Gabara | 327/65 |
| 6,813,483 B1* | 11/2004 | Lynch et al. | 455/283 |
| 7,126,378 B2* | 10/2006 | Stojanovic et al. | 326/87 |
| 2003/0201802 A1* | 10/2003 | Young | 327/108 |
| 2004/0179623 A1* | 9/2004 | Huckeba | 375/257 |

OTHER PUBLICATIONS

"A 5Gbps CMOS Frequency Tolerant Multi Phase Clock Recovery Circuit", by Toru Iwata et al. 1 page. 2002.
Logicore, Bit Correlator v2.0—Product Specification for Xilinx. Mar. 2, 2001. 8 pages.
"Binary Phase Shift Keying", by Don Johnson. Version 2.1: Aug. 23, 2001. pp. 1-4.

(Continued)

*Primary Examiner*—Mohammed Ghayour
*Assistant Examiner*—Lawrence Williams
(74) *Attorney, Agent, or Firm*—Silicon Edge Law Group LLP; Arthur J. Behiel (57) ABSTRACT

Described are communication systems that convey differential and common-mode signals over the same differential channel. Noise-tolerant communication schemes use low-amplitude common-mode signals that are easily rejected by differential receivers, thus allowing for very high differential data rates. Some embodiments employ the common-mode signals to transmit backchannel signals for adjusting the characteristics of the differential transmitter. Backchannel control signals are effectively conveyed even if the forward channel transmitter is so maladjusted that the received differential data is unrecognizable. Systems in accordance with the above-described embodiments obtain these advantages without additional pins or communications channels, and are compatible with both AC-coupled and DC-coupled communications channels. Data coding schemes and corresponding data recovery circuits eliminate the need for complex, high-speed CDR circuits.

35 Claims, 7 Drawing Sheets

OTHER PUBLICATIONS

"Digital Transmitter: Introduction to Frequency Shift Keying," by Matthew Berry. Version 2.2: Sep. 5, 2002. pp. 1-4.

"Phantom Mode Signaling in VLSI Systems", by Thaddeus Gabara. 2001 IEEE. pp. 88-100.

Lattice Semiconductor Corporation, "Differential Signaling", Application Note AN6019. May 2001. 4 pages.

"A Continuous-Time Common-Mode Feedback Circuit (CMFB) for High-Impedance Current Mode Application", by Louis Luh et al. 4 pages. Last Modified Apr. 1, 2004.

"Understanding Common-Mode Signals". APP 2045: May 21, 2003. 8 pages.

"A Multi-Gigabit CMOS Data Recovery Circuit Using an Analog Parallel Sampling Technique", by Kasin Vichienchom et al. 201 IEEE. pp. IV-238-IV-241.

"An Adaptive PAM-4 5-Gb/s Backplane Transceiver in 0.25-um CMOS", by John T. Stonick. IEEE Journal of Solid-State Circuits, vol. 38, No. 3, Mar. 2003. pp. 436-443.

"Digital Systems Engineering", by William J. Dally and John W. Poulton. Cambridge University Press—1998. 2 cover sheets, 366-371.

* cited by examiner

NOISE-TOLERANT SIGNALING SCHEMES SUPPORTING SIMPLIFIED TIMING AND DATA RECOVERY

BACKGROUND

Consumer demand for digital video, high-speed communication, and ever increasing processing speed is pushing manufacturers to adopt faster data transmission schemes. Though the data conveyed is typically digital, designers are favoring analog communication schemes that employ low-voltage differential signals, particularly for moving data within a system. The transmission medium, or "channel," can be pairs of copper lines but is more typically pairs of circuit-board traces extending between integrated circuits. The use of differential signals allows for rejection of common-mode noise, and thus enables data transmission with exceptional speed and common-mode noise immunity.

The Telecommunications Industry Association (TIA) published a standard specifying the electrical characteristics of low-voltage differential signaling (LVDS) interface circuits that can be used to interchange binary signals. LVDS employs low-voltage differential signals to provide high-speed, low-power data communication. For a detailed description of this LVDS Standard, see "Electrical Characteristics of Low Voltage Differential Signaling (LVDS) Interface Circuits," TIA/EIA-644 (March 1996), which is incorporated herein by reference.

Signal distortion limits the sensitivity and bandwidth of any communication system. A form of distortion commonly referred to as "intersymbol interference" (ISI) is problematic in single-ended and differential communication schemes, and is manifested in the temporal spreading and consequent overlapping of individual pulses, or "symbols." Severe ISI prevents receivers from distinguishing symbols and consequently disrupts the integrity of received signals. To make matters more complicated, the characteristics of high-speed signals are highly destination-dependent, which is to say a received signal will appear different depending upon characteristics of the communication channel and receiver. In extreme cases, the transmitter may be so far out of adjustment for the particular communication channel and receiver that the received data is entirely unintelligible. Data transmitters must therefore be tuned to achieve and maintain optimal performance.

Receivers in high-speed communication systems sometimes include control circuitry that monitors various characteristics of incoming signals and tunes the associated transmitter accordingly. Such adjustments to the transmitter may be done once, to account for channel characteristics and process variations, or may be carried out continuously or periodically to additionally account for time-variant parameters, such as supply-voltage and temperature. Performing such adjustments requires receivers to communicate back to the associated transmitter, a process sometimes referred to as "backchannel" communication.

Providing for backchannel communication may be expensive, particularly for systems in which the high-speed communications channel being monitored and adjusted is unidirectional. The backchannel communication takes place in the direction opposite the flow of data, and so may require one or more additional signal paths and associated pins between the communicating circuits. Adding pins and signal paths is expensive and undesirable. In the alternative, bi-directional communication can support backchannel signals, but this option potentially reduces the forward communication bandwidth.

In a paper entitled "Phantom Mode Signaling in VLSI Systems," Thaddeus Gabara describes circuits that facilitate backchannel communication in high-speed differential channels by injecting common-mode signals on the same channel but in the reverse direction as high-speed differential signals. These circuits take advantage of the ability of modern differential receivers to reject common-mode signals; in practice, however, injecting common-mode signals into a high-speed differential communication channel is, from the differential receiver's perspective, no different from injecting common-mode noise. Backchannel communication schemes relying upon common-mode signaling techniques would therefore undesirably limit forward channel transmission speed. There is therefore a need for protocols and circuits that facilitate backchannel communication over high-speed differential channels without unduly limiting the bandwidth of the differential signals.

SUMMARY

The present invention addresses the need for protocols and circuits that facilitate backchannel communication over high-speed differential channels without unduly limiting the bandwidth of the differential signals. Systems in accordance with various embodiments described herein convey high-speed differential signals in a forward direction on a differential communication channel and issue relatively low-speed backchannel control signals in the reverse direction over the same channel.

From the perspective of the forward-channel differential receiver, the common-mode backchannel signals are mere noise, and noise generally limits speed performance. The common-mode backchannel signals are therefore formatted, in accordance with some embodiments, to minimize the impact of common-mode backchannel signals on the forward transmission speed. This common-mode signal formatting employs significantly lower signal amplitudes, frequencies, and slew rates in comparison with the forward channel.

Common-mode signals that minimally impact the forward channel sacrifice common-mode signal integrity to maximize forward-channel speed performance. Common-mode receivers in accordance with various embodiments thus employ noise-tolerant data recovery schemes to compensate for the poor signal quality of the backchannel signals. Various common-mode communications protocols and corresponding common-mode receivers are employed to advantage in these embodiments to recover the relatively weak common-mode signals.

Some embodiments convey common-mode signals without corresponding timing and reference signals. Receivers in those embodiments therefore include circuitry that extracts timing and reference information from the received common-mode signals. Many conventional clock and data recovery (CDR) circuits are available for this purpose, but are relatively complex. Receivers in accordance with some embodiments therefore exploit data coding schemes and corresponding data recovery circuits that eliminate the need for complex, high-speed CDR circuits, and consequently save area and power.

This summary does not limit the invention, which is instead defined by the allowed claims.

DETAILED DESCRIPTION

Figure 1:
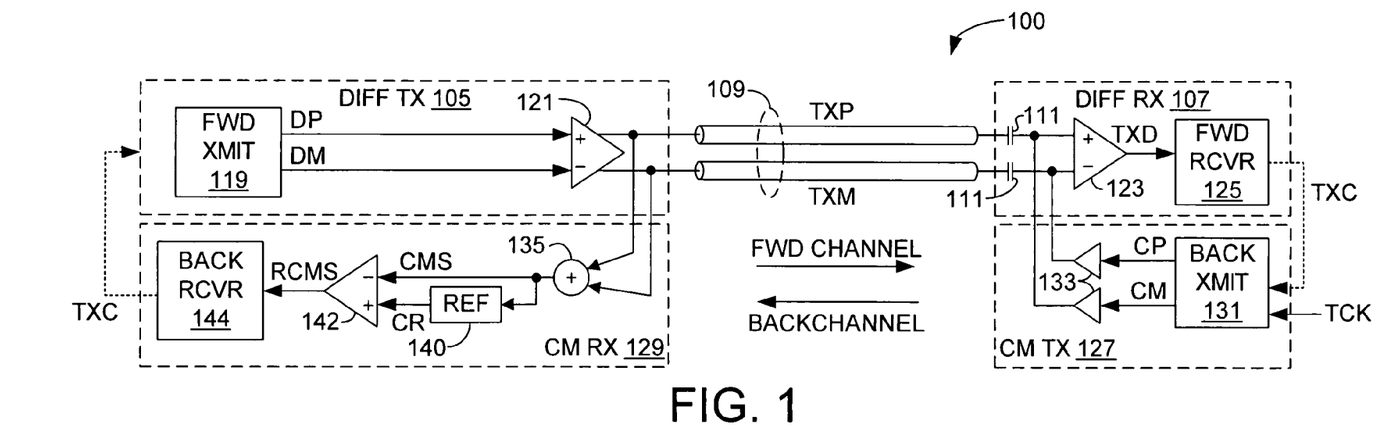
FIG. 1 depicts a communication system 100 in accordance with one embodiment.

FIG. 1 depicts a communication system 100 in accordance with one embodiment. As in conventional systems, system 100 includes a differential transmitter 105 connected to a corresponding differential receiver 107 via a differential communications channel 109. System 100 additionally includes backchannel communications circuitry, a common-mode transmitter 127 communicating backchannel signals, timed to a clock signal TCK, to a common-mode receiver 129 via channel 109. The high-speed differential link between transmitter 105 and receiver 107 is termed the "forward channel," whereas the relatively slow common-mode link between transmitter 127 and receiver 129 is termed the "backchannel."

Various parameters of differential transmitter 105 should be tuned to achieve and maintain optimal performance. Such tuning might affect, for example, on-die termination resistance, drive current, signal swing, equalization (at the transmitter), and phase offset. In addition, for systems that support multiple communication modes, the receiver might instruct the transmitter to transmit in a mode supported by the receiver. To this end, differential receiver 107 monitors various attributes of the received differential signal and, based on the results of this monitoring, develops transmitter-control signals TXC for adjusting transmitter 105. Common-mode transmitter 127 conveys the transmitter-control signals TXC to common-mode receiver 129 as a pair of common-mode signal components injected onto channel 109. (As with other designations herein, TXC refers both to a signal and the corresponding node. Whether a given alphanumeric designation refers to a signal or a node will be clear from the context.) Receiver 129 converts the received common-mode signals back into the original transmitter-control signals TXC from receiver 107 and adjusts differential transmitter 105 accordingly. System 100 is thus able to achieve and maintain transmitter settings that optimize forward transmission speed.

Figure 2A:
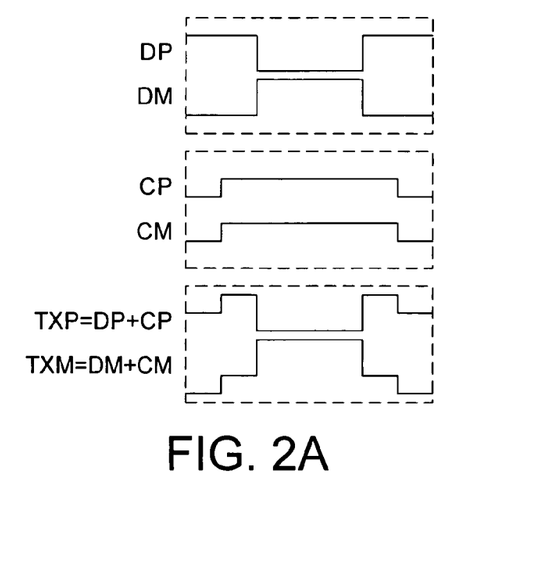
FIGS. 2A and 2B depict waveforms corresponding to like-labeled nodes of FIG. 1.
Figure 2B:
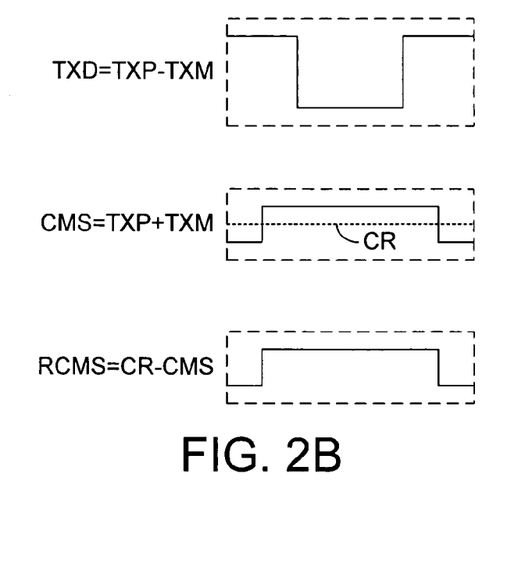

FIGS. 2A and 2B depict waveforms corresponding to like-labeled nodes of FIG. 1, and are used in conjunction with FIG. 1 to describe the operation of communication system 100. Each vertical axis represents a range of voltages for each depicted signal and each horizontal axis a period of time. The waveforms are not to scale, the differential forward-channel signals typically being of higher frequency and magnitude than the common-mode backchannel signals.

The top-most pair of signals in FIG. 2A represents the first and second differential-mode signal components DP and DM, which are conveyed from transmitter 105 to receiver 107 via respective signal conductors TXP and TXM of channel 109. The second signal pair of FIG. 2A depicts first and second common-mode signal components CP and CM, which are conveyed from common mode transmitter 127 to common mode receiver 129 via the corresponding signal conductors of channel 109. Both pairs of signal components may be conveyed over communication channel 109 concurrently, a circumstance depicted in FIG. 2A as first and second composite signal components TXP and TXM, which represent the combined differential and common-mode signal components conveyed via communication channel 109. Common-mode signal components CP and CM are balanced in the depicted AC-coupled embodiment, and characters conveyed using signal components CP and CM are expressed at frequencies high enough to pass through coupling capacitors 111.

From the perspective of differential receiver 107, the common-mode backchannel signals are noise, and noise generally limits speed performance. Common-mode transmitter 127 and receiver 129 are therefore designed, in accordance with the depicted embodiment, to minimize the impact of common-mode backchannel signals on the forward transmission speed. Assuming, for illustrative purposes, that receiver 107 completely rejects the common-mode of composite signal components TXP and TXM, receiver 107 extracts the transmitted data TXD as depicted in FIG. 2B. The means employed by the various embodiments to limit the impact of the backchannel signal on forward-channel performance are detailed below.

The transmitters and receivers in the depicted embodiment are AC-coupled using a set of capacitors. Namely, channel 109 includes first and second signal conductors TXP and TXM, each of which is coupled to a respective differential output terminal of transmitter 105 and to a respective differential input terminal of receiver 107 via one of two capacitors 111. Coupling capacitors can be included on the transmit side of the forward channel instead of or in addition to capacitors 111. The transmitters and receivers are DC coupled in other embodiments, in which case capacitors 111 are omitted.

Differential transmitter 105 conventionally includes a forward-channel transmission circuit 119 differentially coupled to the input terminals of an output amplifier 121. Receiver 107 conventionally includes a differential receive amplifier 123 that converts differential signals on channel 109 into digital data signals TXD for transmission to a forward-channel receiver 125. Receiver 125 conveys the received data to the intended destination (not shown), and additionally develops transmit control signals TXC to control transmitter 105 as needed to optimize the received forward-channel signal.

Common-mode transmitter 127 includes backchannel transmit circuitry 131 that encodes transmit control signals TXC into the appropriate symbol format and conveys the resulting formatted control signals as a pair of identical common-mode signal components CM and CP. A detailed description of transmitter 131 is omitted for brevity, as circuits that merely duplicate an input signal are readily understood by those of skill in the art. Matched buffers 133 convey signal components CM and CP to the respective first and second signal conductors TXM and TXP of communication channel 109. Receiver 129, coupled to conductors TXM and TXP via first and second common-mode input terminals, extracts signal components CM and CP to recover transmit control signals TXC.

Differential amplifiers, including receive amplifier 123, are characterized in part by their ability to reject common-mode signals. The measure of this ability is commonly referred to as the "common-mode rejection ratio," or CMRR. More specifically, the CMRR of a given amplifier is the ratio of a common-mode interference voltage at the input of the amplifier to the corresponding interference voltage at the output. Typical high-speed differential amplifiers of the type described herein boast CMRRs in a range of e.g. from 100:1 to 100:5. While these ratios are impressive, anything less than perfect common-mode rejection allows common-mode noise to interfere with the received differential signal, and consequently limits speed performance.

Buffers 133 are of conventional buffer configurations, but are sized so signal components CM and CP are easily rejected by differential receive amplifier 123. First, buffers 133 are closely matched to produce signal components as nearly identical as practical for a given fabrication process. This matching is important in preventing undesirable common-mode-to-differential signal conversion, as receive amplifier 123 amplifies any difference between the two signal components. Second, the amplitude of the signal components injected into channel 109 is limited to minimize the absolute value of any differences between the two signal components. In an embodiment in which transmitter 105 transmits differential signals having a magnitude of about one volt (e.g., two complementary half-volt signals), each common-mode signal component has an amplitude of about 50 millivolts, or about 10% of the magnitude of the differential signal. Third, buffers 133 provide very low slew rates relative to amplifier 121 and common-mode signal components CM and CP are transmitted at a far lower frequency than the data of the forward channel, both of which facilitate common-mode signal rejection. In one embodiment, for example, the slew rate of the common-mode signal components is sufficiently slow so that the rise or fall times extend across multiple symbols in the faster forward channel. Making buffers 133 small and slow has the additional advantage of minimizing the capacitive loading presented by buffers 133, and consequently minimizing the impact of buffers 133 on the signal integrity and hence the data rate of the forward differential signals.

Fortunately, backchannel communication typically requires far lower bandwidth than forward channel communication, and so can be accomplished at relatively low frequencies, slew rates, and voltages. Some embodiments sacrifice common-mode signal integrity to maximize forward-channel speed performance. Various common-mode communications protocols and corresponding common-mode receivers are employed to advantage in these embodiments to recover the relatively weak common-mode signals.

Common mode receiver 129 includes a common-mode extraction circuit 135, in this embodiment a simple averager that averages composite signal components TXP and TXM from channel 109 to produce a common-mode signal CMS.

The common-mode signal components CP and CM are conveyed without a corresponding reference signal, so receiver 129 in this embodiment includes a reference circuit 140 that extracts a suitable reference signal from signal CMS. In this embodiment reference circuit 140 is a low-pass filter and reference signal CR an average level for signal CMS. A comparator 142 compares the common-mode sum signal CMS with the derived reference signal CR to produce a recovered common-mode signal RCMS, an example of which is depicted in FIG. 2B. The recovered common-mode signal RCMS is then passed to a backchannel receiver 144, which recovers the timing and data from the recovered common-mode signal RCMS and provides corresponding recovered transmit control signals TXC to transmitter 105.

Differential transmitter 105 is AC-coupled to receiver 107, which sets a lower bound for the backchannel communication frequency. The desire to minimize noise in the forward channel sets an upper bound on the amplitude and frequency used to express symbols conveyed via signal components CP and CM. Some embodiments employ a backchannel signaling protocol that passes common-modes signals of sufficient frequency to pass through capacitors 111 and additionally provides a measure of noise tolerance that permits the use of backchannel signals of exceedingly low amplitude.

Figure 3:
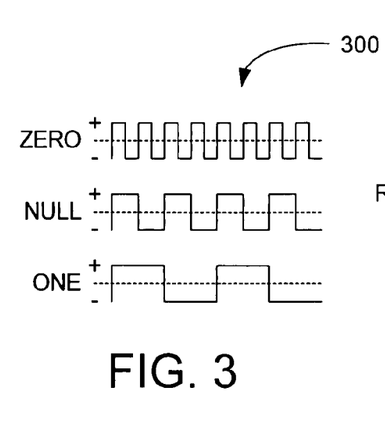
FIG. 3 is a waveform diagram 300 depicting three DC-balanced signals used to convey common-mode data in accordance with one embodiment.

FIG. 3 is a waveform diagram 300 depicting three DC-balanced signals used to convey common-mode data in accordance with one embodiment. The scheme of FIG. 3 represents a logic zero character (ZERO) as a signal having a 50% duty cycle and a first frequency, a null character (no data, or NULL) as a signal having a 50% duty cycle and a second frequency one half the first frequency, and a logic one character (ONE) as a signal having a 50% duty cycle and a frequency one half of the second frequency. The waveforms representative of the three character types (zero, null, and one) are orthogonal, which minimizes the possibility of an incorrect interpretation. The depicted coding scheme is a form of Frequency Shift Keying (FSK), a scheme conventionally employed to transmit digital signals over analog channels. For a brief tutorial of FSK, see "Digital Transmitter: Introduction to Frequency Shift Keying" (Version 2.2), by Matthew Berry (2002). Other embodiments may use other coding schemes, such as Phase Shift Keying, and may use more or fewer characters.

Figure 4:
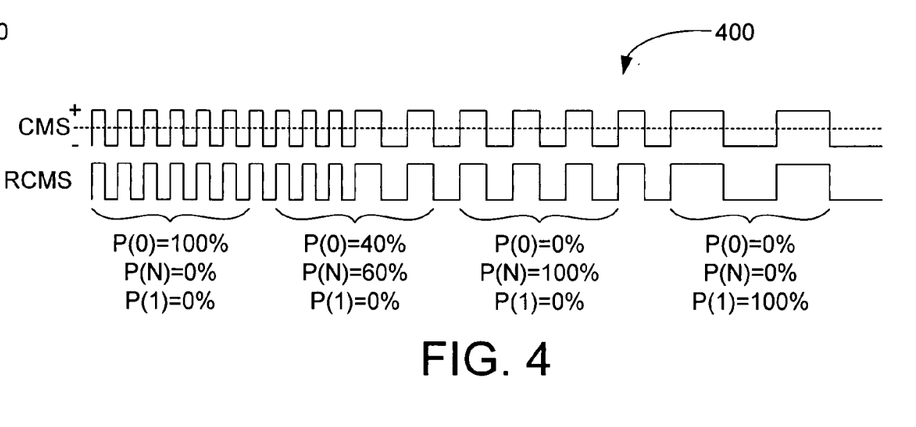
FIG. 4 is a waveform diagram 400 depicting an illustrative common-mode signal CMS and a corresponding recovered common-mode signal RCMS.
Figure 5A:
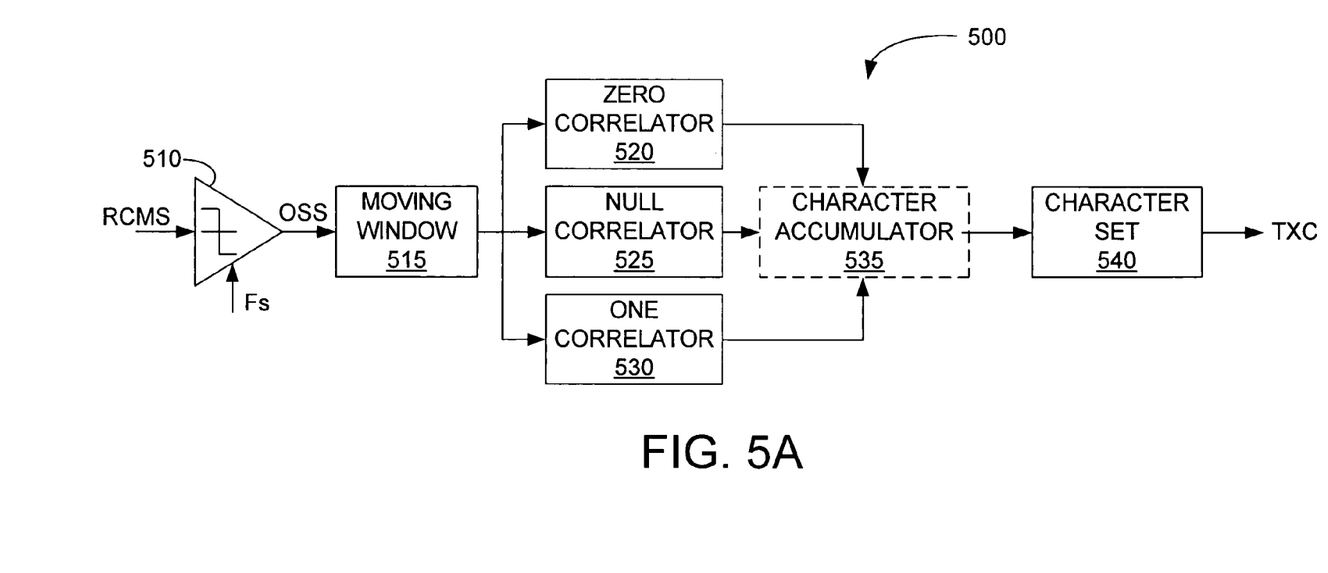
FIG. 5A is a block diagram of a receiver 500 used in one embodiment of backchannel receiver 144 of FIG. 1.
Figure 5B:
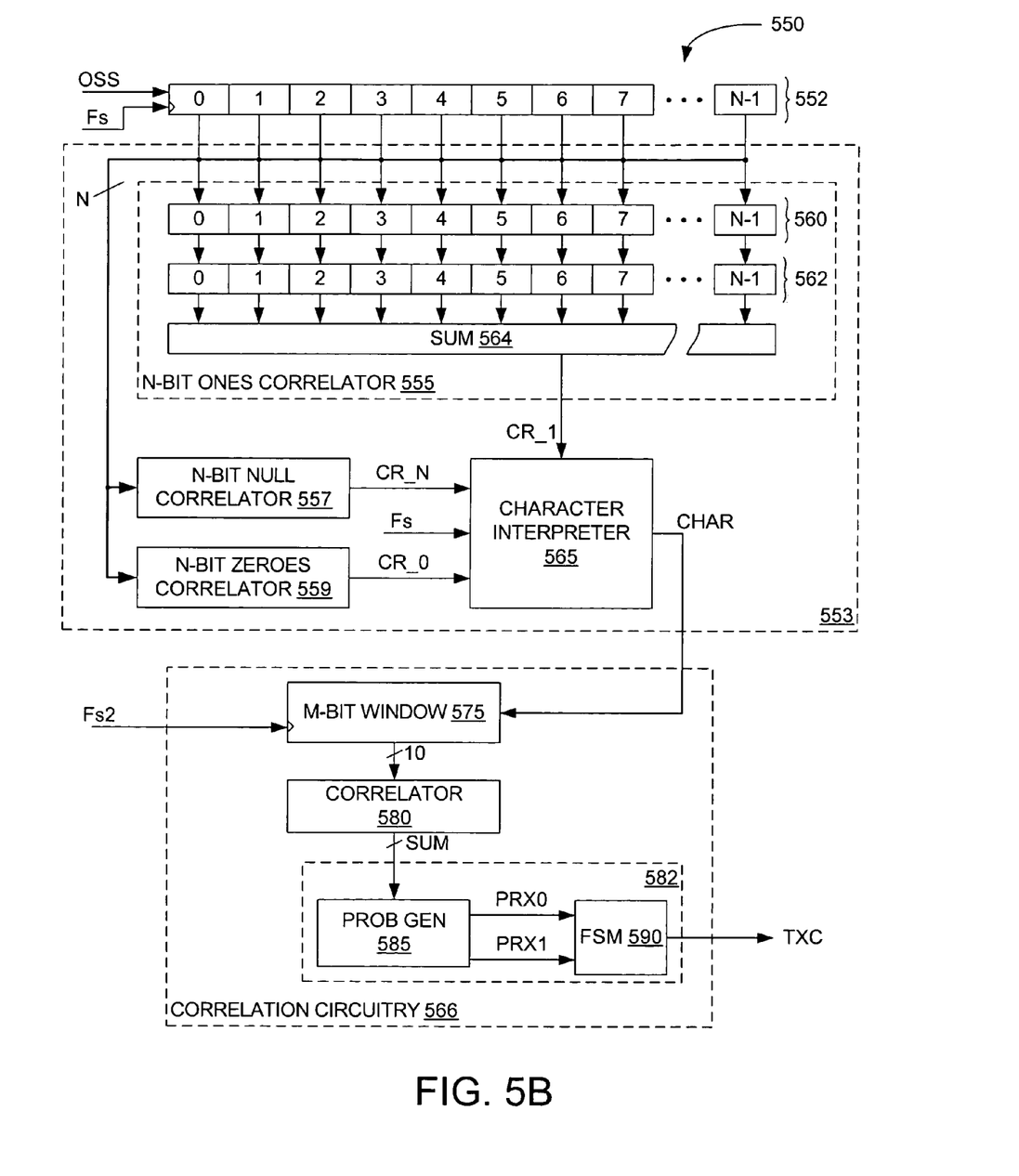
FIG. 5B depicts a receiver 550 for use as backchannel receiver 144 of FIG. 1 in another embodiment.

FIG. 4 is a waveform diagram 400 depicting an illustrative common-mode signal CMS and a corresponding recovered common-mode signal RCMS expressing a zero-null-one data pattern using the corresponding characters of FIG. 3, and is used in conjunction with the following FIGS. 5A and 5B to illustrate the operation of backchannel receivers in accordance with embodiments that rely upon FSK to convey backchannel signals.

FIG. 5A is a block diagram of a receiver 500 used in one embodiment as backchannel receiver 144 of FIG. 1. Receiver 500 includes a slicer 510 that over-samples the recovered common-mode signal RCMS at a sample frequency Fs greater than the maximum frequency used to express characters conveyed as signal components CP and CM. The over-sampling does not require complex, high-speed circuits, as the data rate of the recovered common-mode signal is generally far lower than other data rates supported by the integrated circuit upon which receiver 129 is instantiated. This embodiment obviates the need for complex clock and data recovery circuitry, and consequently saves area and power. Various versions of slicer 510 are well known to those of skill in the art. Several forms are described, for example, in U.S. Pat. No. 5,412,692.

A first-in-first-out (FIFO) windowing circuit 515 captures the over-sampled signal OSS from slicer 510 and periodically compares portions of signal OSS with each of three data correlators 520, 525, and 530. Data correlator 520 produces an output signal indicative of the receipt of a zero character if the contents of windowing circuit 515 correlates with a zero pattern to a predefined degree of precision (e.g., >70%). Correlators 525 and 530 likewise output signals indicative of null and logic one characters, respectively, based on the contents of windowing circuit 515.

Returning to FIG. 4, the action of windowing circuit 515 and the three correlators 520, 525, and 530 is simulated by a series of four curly braces beneath which are shown the relative probabilities of the corresponding series of pulses. In the left-most example, the series of pulses is a 100% representative of a zero character, and offers a zero percent chance of being a null or a logic one. In that case, zeroes correlator 520 produces an output to a character accumulator 535 indicative of a logic zero. The second instance from the left in FIG. 4 shows a time window in which none of the probabilities exceed the required 70%, so none of the correlators expresses a character. The last two highlighted pulse sequences depict 100% probabilities of the receipt of a null character and a logic-one character, respectively.

Character accumulator 535 is optional, but can be included to filter out some errors. Accumulator 535 can be configured to reject character strings that do not conform to some predetermined communication protocol. For example, accumulator 535 can discard character sets that include too many or two few characters, or that otherwise include impermissible data patterns. Character sets 540 that pass the requirements of accumulator 535 are passed as transmitter control signals TXC.

FIG. 5B depicts a receiver 550 for use as backchannel receiver 144 of FIG. 1 in another embodiment. An N-bit windowing circuit 552, a FIFO buffer in this embodiment, receives each incoming bit of input signal OSS, the over-sampled signal OSS from slicer 510 of FIG. 5A. Directed by clock signal Fs, windowing circuit 552 periodically provides N consecutive data samples to corresponding input terminals of data correlation circuitry 553, which decodes the windowed data into a string of characters CHAR. Correlation circuitry 553 includes a ones correlator 555, a null correlator 557, and a zeroes correlator 559. Ones correlator 555 is described and illustrated in some detail; the remaining correlators are similar, so a detailed treatment is omitted for brevity.

Ones correlator 555 includes pattern-matching register 560, a mask register 562, and a summation circuit 564. Data loaded into pattern-matching register 560 is tailored to detect the pattern associated with logic-one characters (e.g., the ONE waveform of FIG. 3). Incoming data in windowing circuit 552 is compared, bit-by-bit, with corresponding bits in pattern-matching register 560. Register 560 includes logic (not shown) that produces a digital one signal to mask register 562 for each bit within register 560 that matches the corresponding data bit in register 552. Mask register 562 conveys these bits to summation circuit 564, but selected bits within mask register 562 can be set to block those bits from summation circuit 564. Summation circuit 564 then adds the ones from mask register 562 and provides the resulting correlation result CR_1 to a character interpreter 565. The pattern stored in pattern-matching register 560 is tailored to detect logic-one data characters, so the magnitude of correlation result CR_1 represents the probability that the data pattern in windowing circuit 552 represents a logic one: the greater the number expressed correlation result CR_1, the greater the probability that the contents of register 552 represents a logic one. The inclusion of registers 560 and 562 allows the match pattern and mask to be varied. In other embodiments, the match pattern, mask, or both are hard wired.

Null correlator 557 is similar to ones correlator 555, but the match pattern is altered to detect null characters (e.g., the NULL waveform of FIG. 3). The magnitude of correlation result CR_N therefore represents the likelihood that the data pattern in windowing circuit 552 represents a null character. Likewise, zeroes correlator 559 is similar to ones correlator 555, but the match pattern is altered to detect zero characters (e.g., the ZERO waveform of FIG. 3). The magnitude of correlation result CR_0 therefore represents the probability that the data pattern in windowing circuit 552 represents a zero character.

Character interpreter 565 considers the values of each correlation result CR_1, CR_N, and CR_0 to identify the receipt of data characters of the type discussed above in connection with FIG. 4. Interpreter 565 detects a character when the corresponding correlation result exceeds a threshold value. Interpreter 565 stalls for N clock cycles of clock Fs each time a character is detected to flush windowing circuit 552 of previously considered data samples. In one embodiment, interpreter 565 issues a voltage representative of a logic one upon detection of a one character followed by a null character, and issues a voltage representative of a logic zero upon detection of a zero character followed by a null character. Character signal CHAR is therefore a digital signal alternating between one and zero. In other embodiments, interpreter 565 represents additional characters (e.g., null), uses different character representations, or both. Data captured in windowing circuit 552 is typically greater than or equal to the character length.

The precision with which interpreter 565 identifies characters can be improved by extending the number N of bits captured by windowing circuit 552 and considered by correlators 555, 557, and 559. The improvement in character recognition does not expand linearly with the number of bits, however, so incremental improvements in noise immunity require disproportionate expansions in the size of receiver 550. Receiver 550 addresses this problem with a second stage of correlation circuitry 566 that filters the output CHAR of character interpreter 565 to further improve the probability of correct signal interpretation without greatly increasing circuit complexity.

To take advantage of the second stage of correlation circuitry in receiver 550, the corresponding transmitter formats transmitted data using specific character patterns to represents data symbols. In a simple example, the transmitter might convey a logic zero as a string of ten zero characters, a null as alternating one and zero characters, and a logic one as ten one characters (each transmitted one or zero character is bounded by null characters in this example). The character patterns CHAR are then subjected to a second level of correlation to further refine the interpretation provided by correlation circuitry 553.

Correlation circuitry 566 includes a windowing circuit 575, a correlator 580, and a second interpreter 582. Windowing circuit 575, a ten-bit FIFO register clocked at the character rate Fs2 in this embodiment, provides the values of ten consecutive characters to correlator 580. Correlator 580 is, in this embodiment, a simple summation circuit that counts the sampled number of logic ones and provides the resultant sum to interpreter 582. A probability generator 585 in interpreter 582 then issues signal PRX1, indicating the probable receipt of a logic one, when the sum from correlator 580 is eight or greater, and issues signal PRX0, indicating the probable receipt of a logic zero, when the sum is three or fewer. A state machine 590, also within interpreter 582, issues logic-one and logic-zero data symbols on line TXC in response to signals PRX0 and PRX1. (An Embodiment of state machine 590 is detailed below as the combined state machine 635 and counter 636 of FIG. 6, the functions of which are described in connection with FIG. 10.)

Receiver 550 can be tuned to achieve a desired balance between noise immunity, symbol rate, and circuit complexity. For improved noise immunity, for example, the sampling frequency can be increased, either or both of windowing circuits 552 and 575 can be extended to store more data samples or characters, the correlators can be adapted to apply different patterns and masks, and character interpreters 565 and 582 can be adjusted to require increased probabilities before indicating receipt of a character or symbol. Receiver 550 can also be extended to include one or more additional levels of correlation, and to recognize additional received characters. These types of modifications can be done in hardware, or configurable resources, such as registers, can be provided to facilitate system tuning.

Figure 6:
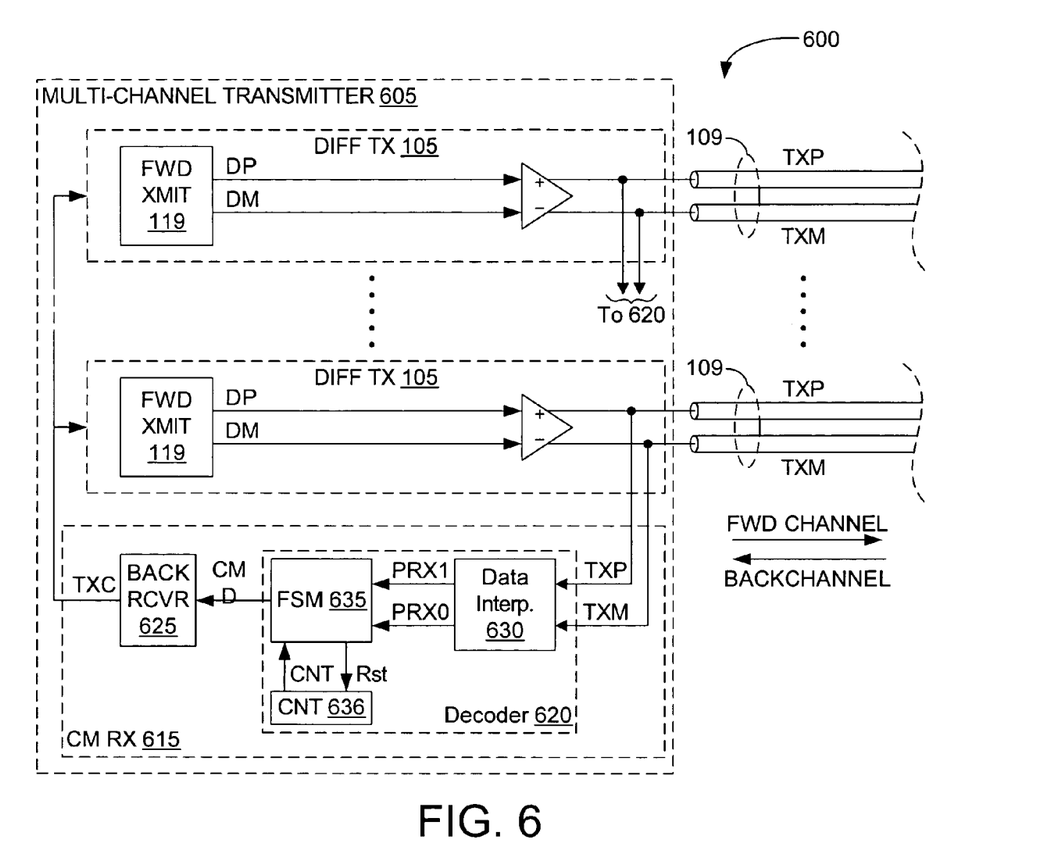
FIG. 6 depicts a portion of a communication system 600 in accordance with another embodiment.

FIG. 6 depicts a portion of a communication system 600 in accordance with another embodiment. System 600 is in many ways like system 100 of FIG. 1, like-identified elements being the same or similar. System 600 includes differential receive circuitry and common-mode transmit circuitry similar to that described in connection with FIG. 1, but is omitted here for ease of illustration.

System 600 includes a multi-channel transmitter 605 incorporating a number of differential transmitters 105, each of which has a corresponding common-mode backchannel receiver 615. Common-mode receiver 615 controls all differential transmitters 105 simultaneously in one embodiment, though the following example assumes receiver 615 controls each transmitter 105 in turn. Receiver 615 has input terminals receiving common-mode signal components from each channel 109 in some embodiments, but the following description is limited to control of the lower-most channel.

Receiver 615 includes a decoder 620 and backchannel receiver 625. Decoder 620 extracts the common-mode backchannel signals from composite signal components TXP and TXM and then decodes the extracted common-mode signal to produce common-mode data CMD. Backchannel receiver 625 translates the received common-mode data into transmitter control signals TXC for controlling the various transmitters 105. In some embodiments, receiver 615 delivers the same control signals to all transmitters 105; in other embodiments, backchannel control signals independently control each forward channel.

In the depicted embodiment, decoder 620 includes a data interpreter 630, a state machine 635, and a counter 636. Data interpreter 630 interprets received common-mode signals, issuing a probable-one signal PRX1 upon receipt of a signal pattern likely representative of a logic one or a probable-zero signal PRX0 upon receipt of a signal pattern likely representative of a logic zero. State machine 635 interprets these signals in light of timing information provided by counter 636 to develop common-mode data CMD. Backchannel receiver 625 interprets data CMD and issues appropriate transmitter control signals TXC.

Figure 7:
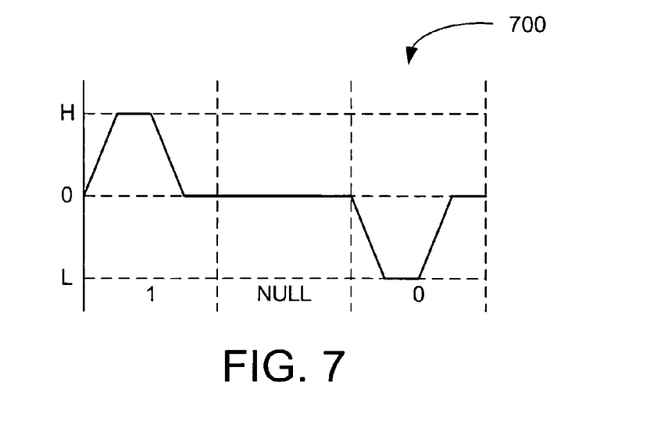
FIG. 7 is a waveform diagram 700 depicting a one-null-zero data pattern expressed in a three-level coding scheme employed by system 600 of FIG. 6.

FIG. 7 is a waveform diagram 700 depicting a one-null-zero data pattern expressed in a three-level coding scheme employed by an embodiment of system 600 of FIG. 6 to convey common-mode data to receiver 615 via one or more of channels 109. Logic one and logic zero characters are expressed as combinations of signal edges in accordance with this embodiment, a protocol that allows receiver 615 to extract both timing and data from a recovered common-mode signal.

Figure 8:
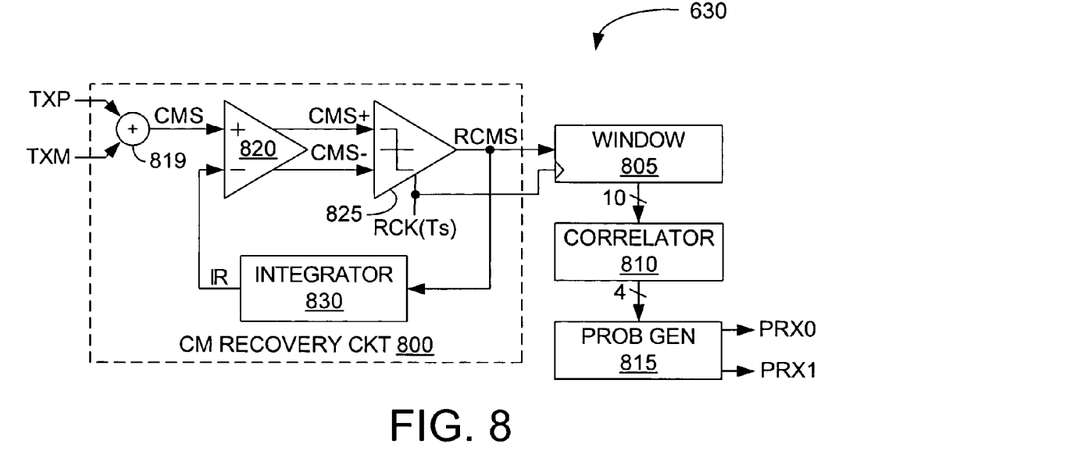
FIG. 8 details an embodiment of data interpreter 630 of FIG. 6.

FIG. 8 details an embodiment of data interpreter 630 of FIG. 6, which includes a common-mode recovery circuit 800, a windowing circuit 805, a correlator 810, and a data probability generator 815. Recovery circuit 800 extracts common-mode data and timing information from a pair of composite signal components TXP and TXM, producing a digital recovered common-mode signal RCMS. Windowing circuit 805, a ten-bit FIFO register in this embodiment, provides the values often consecutive RCMS data samples to correlator 810. Correlator 810 is, in this embodiment, a simple summation circuit that counts the sampled number of logic ones and provides the resultant sum to probability generator 815. Probability generator 815 then issues signal PRX1 upon the probable reception of a logic one (wherein probable means a probability of between 50% and 100%) and signal PRX0 upon the probable reception of a logic zero. In one embodiment, for example, probability generator 815 issues signal PRX1 if windowing circuit 805 samples eight or more logic ones and issues signal PRX0 if windowing circuit 805 samples less than three logic ones in a given ten-sample window.

Data interpreter 630 can be modified to achieve a desired balance between character discrimination and circuit complexity. For improved character discrimination, for example, the sampling frequency can be increased, windowing circuit 805 can be extended to store more sampled RCMS bits, correlator 810 can be adapted to apply different patterns and masks to the sampled data, and probability generator 815 can be adjusted to require increased probabilities before indicating receipt of a character. Correlator 810 can also be extended to include one or more additional levels of correlation, as described above in connection with FIG. 5B. These types of modifications can be hardwired; alternatively, configurable resources, such as registers, can be provided facilitate system tuning. The speed with which the transmitter conveys data can be reduced to further improve character discrimination.

Figure 9:
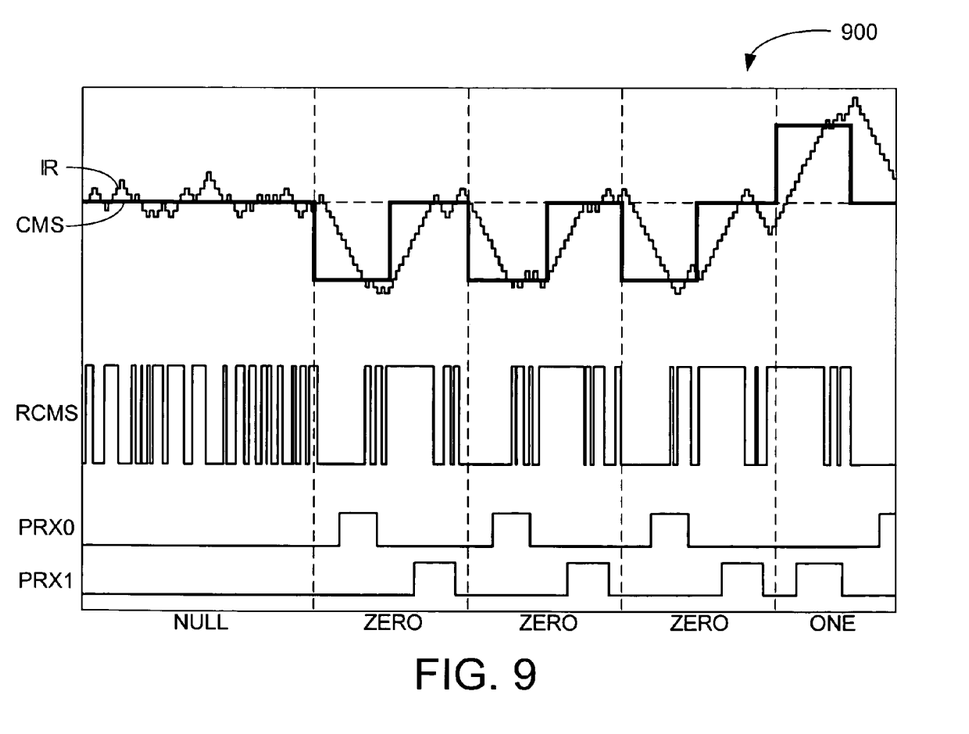
FIG. 9 is a waveform diagram 900 illustrating the function of recovery circuit 800.

Recovery circuit 800 includes a common-mode extraction circuit 819, a comparator 820, an over-sampler (slicer) 825 operating at a sample period Ts of a receive clock RCK, and an integrator 830 connected between the output of slicer 825 and an input of comparator 820. FIG. 9 is a waveform diagram 900 illustrating the function of recovery circuit 800.

Common-mode extraction circuit 819, an averager in this embodiment, averages signal components TXP and TXM to produce an unreferenced common-mode signal CMS. In the example of FIG. 9, the illustrative common-mode signal CMS represents, from left to right, a zero-zero-zero-one character sequence preceded by a null signal. Comparator 820 compares signal CMS with an integrated reference signal IR derived from the output of slicer 825 by integrator 830. Slicer 825 over-samples the signal from comparator 820 to produce a recovered common-mode signal RCMS synchronized with the receiver.

The recovered signal RCMS expresses logic one and zero samples as relatively high and low voltage levels, respectively. Recovered signal RCMS is expected to approximately alternate between ones and zeroes in response to null signals. Windowing circuit 805 will therefore store about the same number of ones as zeroes. Upon receipt of zero character, however, slicer 825 holds a value expressing a logic zero over a series of clock cycles, causing windowing circuit 805 to convey mostly zeroes to correlator 810. This condition is depicted in FIG. 9 as the receipt of the left-most zero character. When windowing circuit contains less than three logic ones, and correlator 810 conveys this low ones count to probability generator 815, probability generator 815 interprets the dearth of ones as the probable receipt of a logic zero character and consequently asserts the probable zero signal PRX0. Logic-one characters are interpreted in a similar fashion, except that slicer 825 holds a value expressing a logic one over a series of clock cycles, causing correlator 810 to convey a relatively high number to probability generator 815. Probability generator 815 interprets this relative abundance of ones (e.g., eight or more) as the probable receipt of a logic one character and consequently asserts the probable one signal PRX1.

Figure 10:
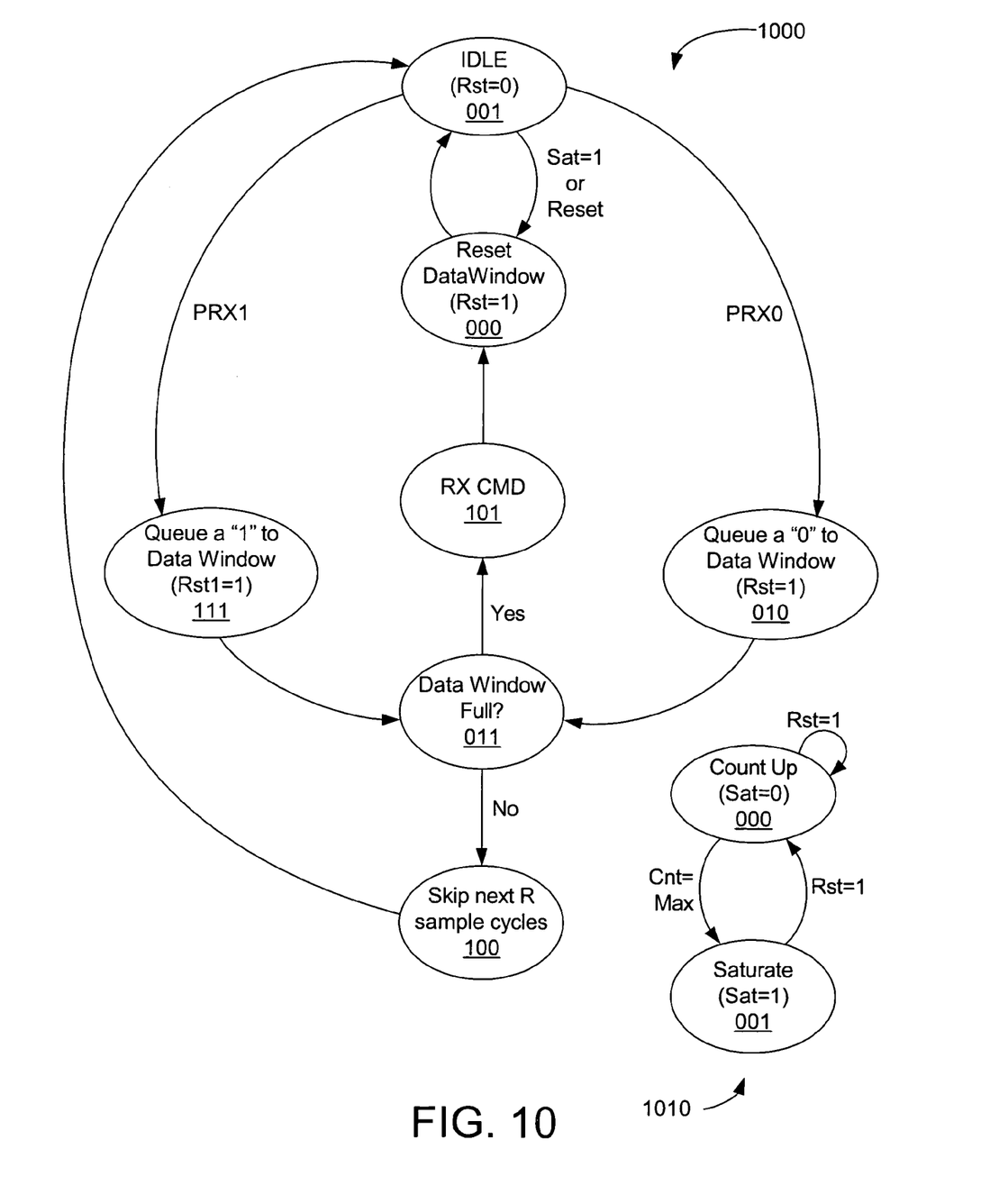
FIG. 10 depicts a pair of state diagrams 1000 and 1010 illustrating the operation of state machine 635 and counter 636 of FIG. 6.

FIG. 10 includes two state diagrams: a state diagram 1000 depicting the operation of state machine 635 of FIG. 6 and a state diagram 1010 depicting the operation of counter 636, also of FIG. 6. This example assumes a communication protocol in which data is presented in four-bit windows: data having more or fewer than four bits is deemed erroneous and is consequently ignored. The four-bit example is selected for ease of illustration, but practical systems may support windows with more or fewer bits. Both state diagrams 1000 and 1010 are timed using receive clock RCK in one embodiment.

As depicted in state diagram 1010, counter 636 begins in state 000 and counts cycles of the receive clock. Counter 636 transitions to state 001 and asserts a saturate signal (Sat=1) if the count reaches a maximum number Max. The communication protocol defines the number Max as a number of receiver clock cycles within which a subsequent data character must be received. State machine uses output Sat from counter 636 to reject received characters that are more widely spaced than the protocol allows.

Turning now to state diagram 1000 and the behavior of state machine 635, state machine 635 transitions to state 000 at start-up, upon receipt of a system reset, or upon assertion of saturation signal Sat from counter 636. State machine 635 then asserts counter-reset signal Rst to zero counter 636. Reset signal Rst might also be used to preset windowing circuit 805 to store data indicative of a null signal (e.g., alternating ones and zeros). State machine 635 then moves to an idle state 001, de-asserts reset signal Rst to allow counter 636 to begin incrementing, and monitors the probable one and probable zero outputs PRX and PR0 from data interpreter 630. In the absence of received data characters, or noise interpreted as a data character, state machine 635 transitions back and forth between states 000 and 001 each time counter 636, as expressed in state machine 1010, asserts saturation signal Sat.

Referring to the example of FIG. 9, in which the first received data character, read from left to right, represents a logic zero, interpreter 630 asserts signal PRX0, inducing state machine 635 to transition from state 001 to state 010. State machine 635 then queues a logic zero, resets counter 636, and transitions to state 011. This examples assumes a four-bit window and only one data sample has been received to this point. The window is not full, so state machine 635 transitions to state 100 for R clock cycles before returning to idle state 001. The number R of skipped clock cycles is selected so state machine 635 ignores the subsequent assertion of signal PRX1 that results from the received signal returning to a null condition. Referring to FIG. 9, for example, the left-most pulse in signal PRX1 is not due to the receipt of a logic one data character, but is instead an artifact of signal CMS returning from a logic-zero condition to the null condition. State machine 635 remains in state 100 after detecting the assertion of a logic zero until the subsequent artifact has had time to pass. The number R is known in advance for a given system, and state machine 635 is set accordingly.

Once again in idle state 001, state machine 635 awaits assertion of one of signals PRX1 and PRX0 indicating receipt of a second character. If neither signal is asserted before counter 636 asserts saturation signal Sat (Sat=1), state machine 635 returns to state 000 and begins anew. Upon assertion of signal PRX0, state machine 635 repeats the process described above. State machine 635 behaves in the same manner when signal PRX1 is asserted in response to a perceived logic one character, but transitions to state 011 via state 111 instead of via state 010.

Once state machine 635 receives four consecutive data characters spaced sufficiently close to avoid a reset from counter 636, state 011 transitions to state 101 and issues the queued four-bit number to backchannel receiver as common-mode data CMD and returns once again to state 001 via state 000 to await subsequent characters. As discussed above in connection with FIG. 6, backchannel receiver 625 interprets the common-mode data CMD and issues appropriate transmit control signals TXC.

As with system 100 of FIG. 1, communication system 600 of FIG. 6 employs a very noise-tolerant backchannel communication scheme to support low-amplitude common-mode signals that are easily discriminated from high-speed differential signals. These communication schemes thus allow for very high forward channel data rates. Also important, backchannel signals used to optimize transmitter characteristics communicate effectively even if the forward channel transmitter is so maladjusted that the received forward-channel data is unrecognizable. This insensitivity to the signal quality of the differential channel is a significant improvement over backchannel communication systems that employ high-speed differential signaling. Systems in accordance with the above-described embodiments obtain these advantages without additional pins or communications channels, and are compatible with both AC-coupled and DC-coupled communications channels. Also important, decoder 620 issues commands CMD at the same average rate they are generated by the corresponding transmitter, but the timing of commands CMD is defined by receive clock RCK, which is asynchronous with respect to the transmit clock TCK (FIG. 1) used to time the backchannel data. As a consequence, system 600 need not recover transmit clock TCK from the arriving backchannel data, a characteristic that eliminates the need for complex, area-intensive clock recovery circuitry. Receive and transmit clocks RCK and TCK are mesochronous in some embodiments.

Figure 11:
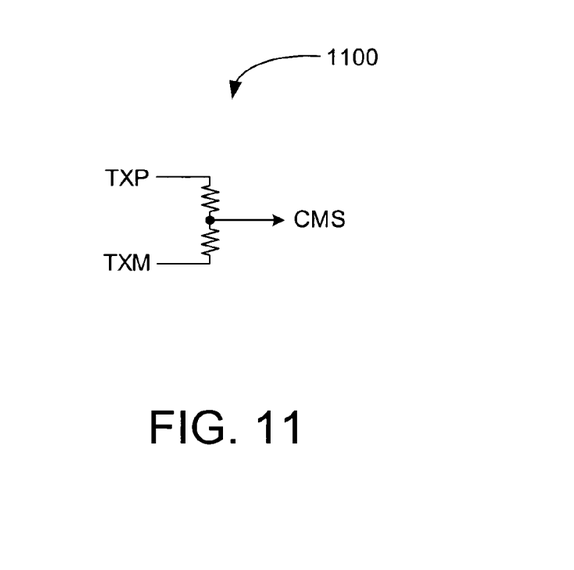
FIG. 11 depicts a simple common-mode extraction circuit 1100 in accordance with one embodiment.

FIG. 11 depicts a simple common-mode extraction circuit 1100 in accordance with one embodiment. Extraction circuit 1100, a set of two series connected resistors, is the averager of FIG. 1 in one embodiment.

Figure 12:
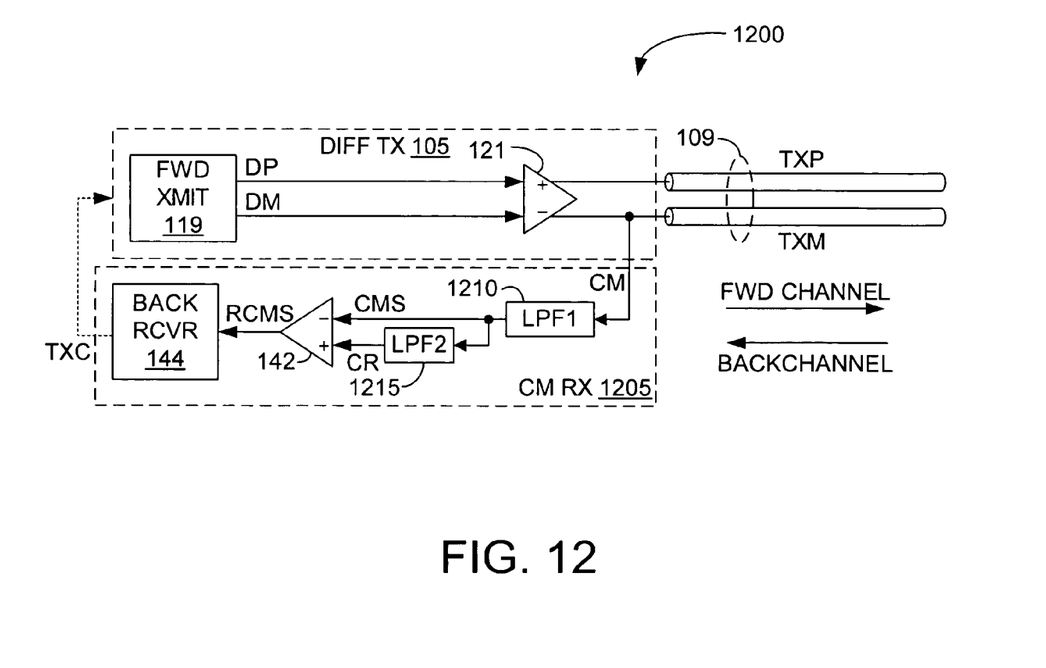
FIG. 12 depicts a signal transmission system 1200, including a differential transmitter 105, communication channel 109, and a common-mode receiver 1205.

FIG. 12 depicts a signal transmission system 1200, including a differential transmitter 105, communication channel 109, and a common-mode receiver 1205. System 1200 is in many ways similar to system 100 of FIG. 1, like-identified elements being the same or similar. In contrast to common-mode receiver 129 of FIG. 1, receiver 1205 extracts the common-mode signal from just one of signal components TXP and TXM, component TXM in the depicted example.

The example of FIG. 12 assumes the backchannel communication frequency is low relative to the forward channel frequency. A common-mode extraction circuit 1210, a low-pass filter in this case, rejects the high-frequency, forward-channel component of signal TXM to recover common-mode signal component CM. A second low-pass filter 1215, this one having a lower cutoff frequency than extraction circuit 1210, derives a reference signal CR. The remaining portions of receiver 1205 function in the manner of receiver 129 of FIG. 1.

Unless otherwise defined, terminals, lines, conductors, and traces that carry a given signal fall under the umbrella term "node." In general, the choice of a given description of a circuit node is a matter of style, and is not limiting. Likewise, the term "connected" is not limiting unless otherwise defined. Moreover, some components are shown directly connected to one another while others are shown connected via intermediate components. In each instance the method of interconnection, or "coupling," establishes some desired electrical communication between two or more nodes. Such coupling may often be accomplished using a number of circuit configurations, as will be understood by those of skill in the art.

While the present invention has been described in connection with specific embodiments, variations of those embodiments will be obvious to those of ordinary skill in the art. For example, the utility of the above-described communication schemes is not limited to backchannel communication, and can convey data in either or both directions along a differential channel. Therefore, the spirit and scope of the appended claims should not be limited to the foregoing description. Only those claims specifically reciting "means for" or "step for" should be construed in the manner required under the sixth paragraph of 35 U.S.C. section 112.

What is claimed is:

1. A communication system comprising:
   a. a differential transmitter having first and second differential output terminals transmitting a differential signal;
   b. a differential communications channel having:
      i. a first signal conductor coupled to the first differential output terminal; and
      ii. a second signal conductor coupled to the second differential output terminal;
   c. a differential receiver having a first differential input terminal coupled to the first signal conductor and a second differential input terminal coupled to the second signal conductor, the differential receiver receiving the differential signal from the differential transmitter via the differential communication channel;
   d. a common-mode transmitter having a first common-mode output terminal coupled to the first signal conductor and a second common-mode output terminal coupled to the second signal conductor, wherein the common-mode transmitter transmits a first common-mode signal component over the first signal conductor and a second common-mode signal component on the second signal conductor; and
   e. a common-mode receiver having:
      i. a common-mode extraction circuit having an extraction circuit input terminal coupled to the first signal conductor and an extraction circuit output terminal, the extraction circuit extracting a common-mode signal from at least one of the first and second common-mode signal components; and
      ii. a reference circuit having a reference-circuit input terminal coupled to the extraction circuit output terminal and a reference-circuit output terminal, the reference circuit deriving a common-mode reference signal from the common-mode signal and providing the common-mode reference signal on the reference-circuit output terminal.

2. The communication system of claim 1, wherein the extraction circuit includes a second extraction circuit input terminal coupled to the second signal conductor.

3. The communication system of claim 2, wherein the extraction circuit comprises a voltage divider extending between the first and second signal conductors.

4. The communication system of claim 1, wherein the extraction circuit comprises a filter having a cutoff frequency.

5. The communication system of claim 4, wherein the filter is a low-pass filter.

6. The communication system of claim 4, wherein the reference circuit comprises a second filter having a second cutoff frequency lower than the first-mentioned cutoff frequency.

7. The communication system of claim 6, wherein the second filter is a low-pass filter.

8. The communication system of claim 1, the common-mode receiver further comprising a comparator having a first comparator input terminal coupled to the extraction circuit output terminal and a second comparator input terminal coupled to the reference-circuit output terminal.

9. The communication system of claim 1, wherein the reference circuit comprises a low-pass filter.

10. The communication system of claim 1, wherein the differential transmitter transmits the differential signal to the differential receiver in a first direction along the communications channel and the common-mode transmitter transmits the first and second common-mode signal components in a second direction opposite the first direction along the communications channel.

11. The communication system of claim 1, wherein the first and second common-mode signal components express a first logic level using a first data pattern having a first period and express a second logic level using a second data pattern having a second period.

12. The communication system of claim 11, wherein the first and second data patterns have duty cycles of 50%.

13. The communication system of claim 12, wherein at least one of the differential transmitter, the differential receiver, the common-mode transmitter, and the common-mode receiver is capacitively coupled to the communications channel.

14. The communication system of claim 1, wherein the common-mode receiver includes a back-channel receiver receiving the common-mode signal.

15. The communication system of claim 14, wherein the back-channel receiver issues transmitter-control signals to the differential transmitter.

16. The communication system of claim 14, wherein the back-channel receiver includes a slicer receiving the common-mode signal and a receive clock, the slicer sampling the common-mode signal with the receive clock to produce sampled common-mode data.

17. The communication system of claim 16, wherein the back-channel receiver further comprises a windowing circuit storing segments of the sampled common-mode data.

18. The communication system of claim 17, wherein the back-channel receiver further comprises character-correlation circuitry coupled to an output of the windowing circuit.

19. A communication system comprising:
   a. a differential transmitter having first and second differential output terminals transmitting a differential signal;
   b. a differential communications channel having:
      i. a first signal conductor coupled to the first differential output terminal; and ii. a second signal conductor coupled to the second differential output terminal;
c. a differential receiver having a first differential input terminal coupled to the first signal conductor and a second differential input terminal coupled to the second signal conductor, the differential receiver receiving the differential signal from the differential transmitter via the differential communication channel;
d. a common-mode transmitter having a first common-mode output terminal coupled to the first signal conductor and a second common-mode output terminal coupled to the second signal conductor, wherein the common-mode transmitter transmits a first common-mode signal component over the first signal conductor and a second common-mode signal component on the second signal conductor;
e. a common-mode-signal decoder having:
    i. a first common-mode input terminal coupled to the first signal conductor and receiving the first common-mode signal component;
    ii. a second common-mode input terminal coupled to the second signal conductor and receiving the second common-mode signal component; and
    iii. a data interpreter having a first interpreter input terminal coupled to the first common-mode input terminal, a second interpreter input terminal coupled to the second common-mode input terminal, and an interpreter output port;
    iv. wherein the data interpreter issues a probable-logic-one data interpretation on the interpreter output port if the first and second common-mode signal components together express a data character representing a probability of expressing a logic one, wherein the probability is between 50% and 100%.

20. The communication system of claim 19, wherein the data interpreter generates probability data expressing the probability.

21. The communication system of claim 19, wherein the common-mode transmitter transmits the first and second common-mode signal components at a first clock frequency, and wherein the data interpreter includes an oversampler receiving the common-mode signal components and a sample clock, the sample clock having a second clock frequency greater than the first clock frequency.

22. The communication system of claim 19, further comprising a state machine having a state-machine input port coupled to the interpreter output port, wherein the state machine issues common-mode data in response to a series of data interpretations, including at least one of the probable-logic-one data interpretation and a probable-logic-zero data interpretation.

23. The communication system of claim 19, wherein the first and second common-mode signal components express a first logic level using a first data pattern having a first period and express a second logic level using a second data pattern having a second period.

24. The communication system of claim 23, wherein the first and second data patterns have duty cycles of 50%.

25. The communication system of claim 24, wherein at least one of the differential transmitter, the differential receiver, the common-mode transmitter, and the common-mode receiver is capacitively coupled to the communications channel.

26. The communication system of claim 19, wherein the common-mode receiver includes a back-channel receiver coupled to the common-mode decoder and receiving a common-mode signal derived from the first and second common-mode signal components.

27. The communication system of claim 26, wherein the back-channel receiver issues transmitter-control signals to the differential transmitter.

28. A method for controlling differential signals transmitted from a differential transmitter to a differential receiver via differential first and second conductors, the method comprising:
a. generating, in the differential receiver, a transmitter-control signal;
b. converting the transmitter-control signal to first and second common-mode-signal components, each signal component representing the transmitter-control signal as a series of characters, each character representative of a logic level and having a duty cycle of 50%;
c. inserting the first common-mode signal component on the first conductor and the second common-mode signal component on the second conductor, thereby conveying the first and second common-mode signal components to the differential transmitter;
d. combining the first and second common-mode signal components at the transmitter to produce a common-mode signal representative of the transmitter-control signal;
e. filtering the common-mode signal to obtain a reference signal;
f. comparing the reference signal and the common-mode signal to obtain a recovered common-mode signal; and
g. altering characteristics of the differential signal in response to the recovered common-mode signal.

29. The method of claim 28, wherein filtering the common-mode signal comprises passing the common-mode signal through a low-pass filter.

30. The method of claim 28, wherein filtering the common-mode signal comprises over-sampling the common-mode signal.

31. The method of claim 30, wherein filtering the common-mode signal further comprises integrating the over-sampled common-mode signal.

32. The method of claim 28, wherein filtering the common-mode signal further comprises recovering a second series of characters from the common-mode signal and calculating, for ones of the second series of characters, a probability that the one of the second series of characters is representative of a logic one or a logic zero.

33. A communication system comprising:
a. a differential transmitter having first and second differential output terminals transmitting a differential signal;
b. a differential communications channel having:
    i. a first signal conductor coupled to the first differential output terminal; and
    iii. a second signal conductor coupled to the second differential output terminal;
c. a differential receiver having a first differential input terminal coupled to the first signal conductor and a second differential input terminal coupled to the second signal conductor, the differential receiver receiving the differential signal from the differential transmitter via the differential communication channel;
d. a common-mode transmitter having a first common-mode output terminal coupled to the first signal conductor and a second common-mode output terminal coupled to the second signal conductor, wherein the common-mode transmitter transmits a first common-mode signal component over the first signal conductor and a second common-mode signal component on the second signal conductor; and e. a common-mode receiver having:
  i. a first common-mode input terminal coupled to the first signal conductor and receiving the first common-mode signal component;
  ii. a second common-mode input terminal coupled to the second signal conductor and receiving the second common-mode signal component;
  iii. means for rejecting the differential signal to produce a common-mode signal; and
  iv. means for deriving a common-mode reference from the common-mode signal.

34. The communication system of claim 33, wherein the means for deriving a common-mode reference include a low-pass filter.

35. The communication system of claim 33, wherein the means for deriving a common-mode reference include an integrator.

* * * * *